MULTIPANEL TELEVISION SYSTEM

Filed Jan. 13, 1964 3 Sheets-Sheet 1

INVENTOR.
PHILIP STANLEY SMITH

BY Eyre, Mann & Lucas

ATTORNEYS

INVENTOR.
PHILIP STANLEY SMITH
BY Eyre, Mann & Lucas
ATTORNEYS

Dec. 13, 1966 P. S. SMITH 3,291,905

MULTIPANEL TELEVISION SYSTEM

Filed Jan. 13, 1964

3 Sheets-Sheet 3

INVENTOR.
PHILIP STANLEY SMITH

BY Eyre, Mann & Lucas

ATTORNEYS

United States Patent Office 3,291,905

Patented Dec. 13, 1966

3,291,905

MULTIPANEL TELEVISION SYSTEM

Philip Stanley Smith, 1005 Rydal Road, Cherry Hill, N.J.

Filed Jan. 13, 1964, Ser. No. 337,375
3 Claims. (Cl. 178—6.8)

The present invention relates to systems for the recording, transmission, and projection of television images and provides such a system which records, transmits, and projects television images in overlapping sections.

In present day theatre television projection systems, the recording, transmission, and projection of television images is done in a single panel. While the optical quality of the pictures produced on the screen with such systems has been generally satisfactory, they are esthetically unsatisfactory for a number or reasons. One such reason is that, the size of the projected images is quite small because of limitations in the projection equipment. Another reason is that, the relationship between the width and the height of the projected images is not suited for most theatre television program material because Federal Communication Commission Rules governing commercial television require a 4 to 3 aspect ratio.

In accordance with the present invention, the size of the picture is increased and the width of the televised scene is made approximately 2⅔ times the height of the scene by splitting the scene into two side by side overlapping sections and projecting these sections on the screen from separate projectors without a material affect on the optical quality of the presented scene.

For a better understanding of the present invention and other advantages thereof reference should be had to the accompanying drawings of which:

Figure 1:
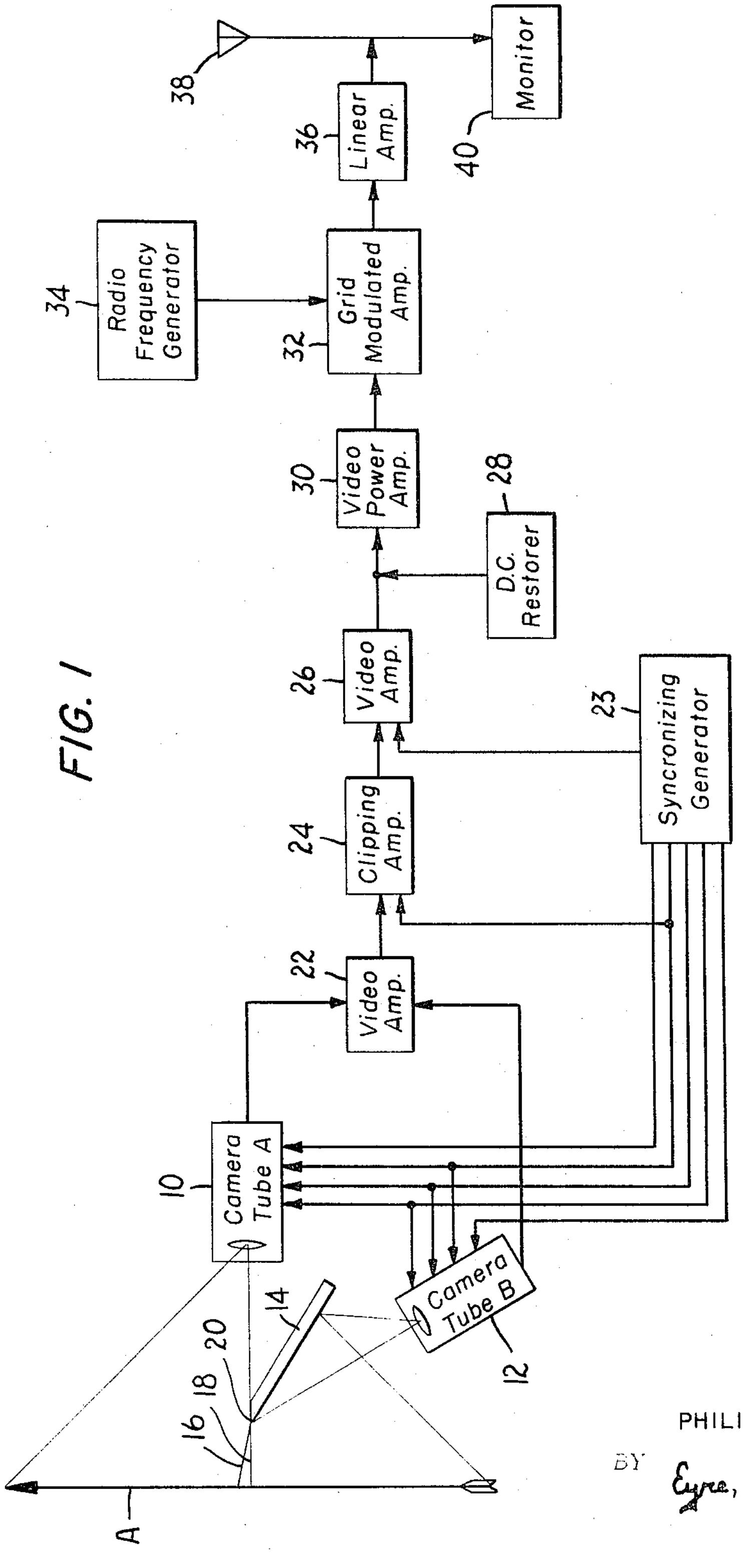
FIGURE 1 is a block diagram of a television transmitting system employing the present invention.

Referring to FIGURE 1, two identical image orthicon tubes are positioned to televise the scene represented by the arrow A. One of the tubes 10 picks up the arrow tip portion of the scene directly while the other tube 12 picks up the reflection of the arrow tail portion of the scene off a front surfaced mirror 14 with a bevelled knife edge. The mirror 14 is positioned between the two tubes 10 and 12 so that the mirror image point of the entrance pupil of the lens for tube 12 substantially corresponds with the actual entrance pupil of the lens for tube 10.

Therefore, the scene is recorded in two sections, one by the camera tube 10 and the other by the camera tube 12. Each section is slightly larger than half the whole recorded scene as indicated by the lines 16 and 18 that define a small portion of the scene between them which is recorded on both the camera 10 and the camera 12. Overlapping the sections of the scene in this manner will enable the projection of continuous images on the screens of the theatres by overlapping the sections of the scene on the screen of the theatre.

Though the scenes are overlapped they do not produce a bright stripe on the screen in the overlapped area because of the bevelled knife edge of the mirror causes the light reaching each of the camera tubes 10 and 12 to fall off in light intensity towards the edge of the section of the scene being recorded. As a result of this when the sections are projected on the screen there is a fall off in the intensity of the projected light of each section of the scene to provide a complete scene which is without light discontinuities.

A black vane 20 is positioned along the knife edge of the mirror 14 on the bevelled side thereto to cut off the view camera tube 12 at the edge of the mirror. Otherwise, the camera tube 12 would view past the mirror and pick up irrelevant picture information from the adjacent section being televised by the camera tube 10.

The picture information outputs of the two tubes are fed into a video amplifier 22 where they are summed. To prevent superimposing of the video information from one tube upon the other in the video amplifier 22, the synchronizing generator 23 applies a blanking pulse to the target screens of the two image orthicon camera tubes 10 and 12 which alternately blanks the outputs of the two tubes for a whole frame. In this way the picture information from only one tube is applied to the input of the video amplifier at any one time and the picture information from both tubes is applied to the input of the video amplifier serially so that first the picture information of a scene from say camera tube 10 reaches the video amplifier 12 and then the picture information from camera tube 12 reaches the video amplifier 22. In this way, in two successive frames of picture information the whole scene is fed into the video amplifier. Therefore, the output of the video amplifier contains sufficient data to reproduce the total scene.

In addition to providing the alternate frame blanking pulses to the target screen of each of the camera tubes 10 and 12, the synchronizing generator 23 also supplies the vertical and horizontal blanking pulses to the target screen in each of the camera tubes 10 and 12 and provides the vertical and horizontal sweep voltages to the camera tubes 10 and 12. The same blanking pulses and sweep voltages are supplied to both camera tubes. Therefore the beams in the camera tubes sweep the target plates in synchronism.

The remainder of the television transmitting system is standard. The output of the video amplifier 22 is fed into a clipping amplifier 24 along with horizontal and vertical blanking pulses from the synchronizing generator 23. The clipping amplifier cuts off the tops of the blanking pulses just beyond the black level. The output of the clipping amplifier 24 is fed into a second video amplifier 26 and there added to synchronizing and equalizing pulses from the synchronizing generator 23.

At the output of the second video amplifier 26 all the blanking pulses of the video signal are made the same magnitude, irrespective of the magnitude of the light intensity signals from the image orthicon 10 and 12, by a D.C. restorer 28. The restored signal is then fed into a D.C. power amplifier 30 to amplify both the D.C. voltage and the video frequency voltage, and the amplified voltage applied to the grid of the modulator 32 where it is employed to modulate the radio frequency signals produced by the radio frequency generator 34 to provide the video modulated radio frequency signal. This signal is fed through a linear amplifier 36 to the antenna 38 where it is transmitted. The tank circuits of the linear amplifier 36 are tuned to one side of the radio frequency to obtain the usual vestigial sideband characteristic, and the output of the linear amplifier 36 is checked by monitoring equipment 40.

Figure 2:
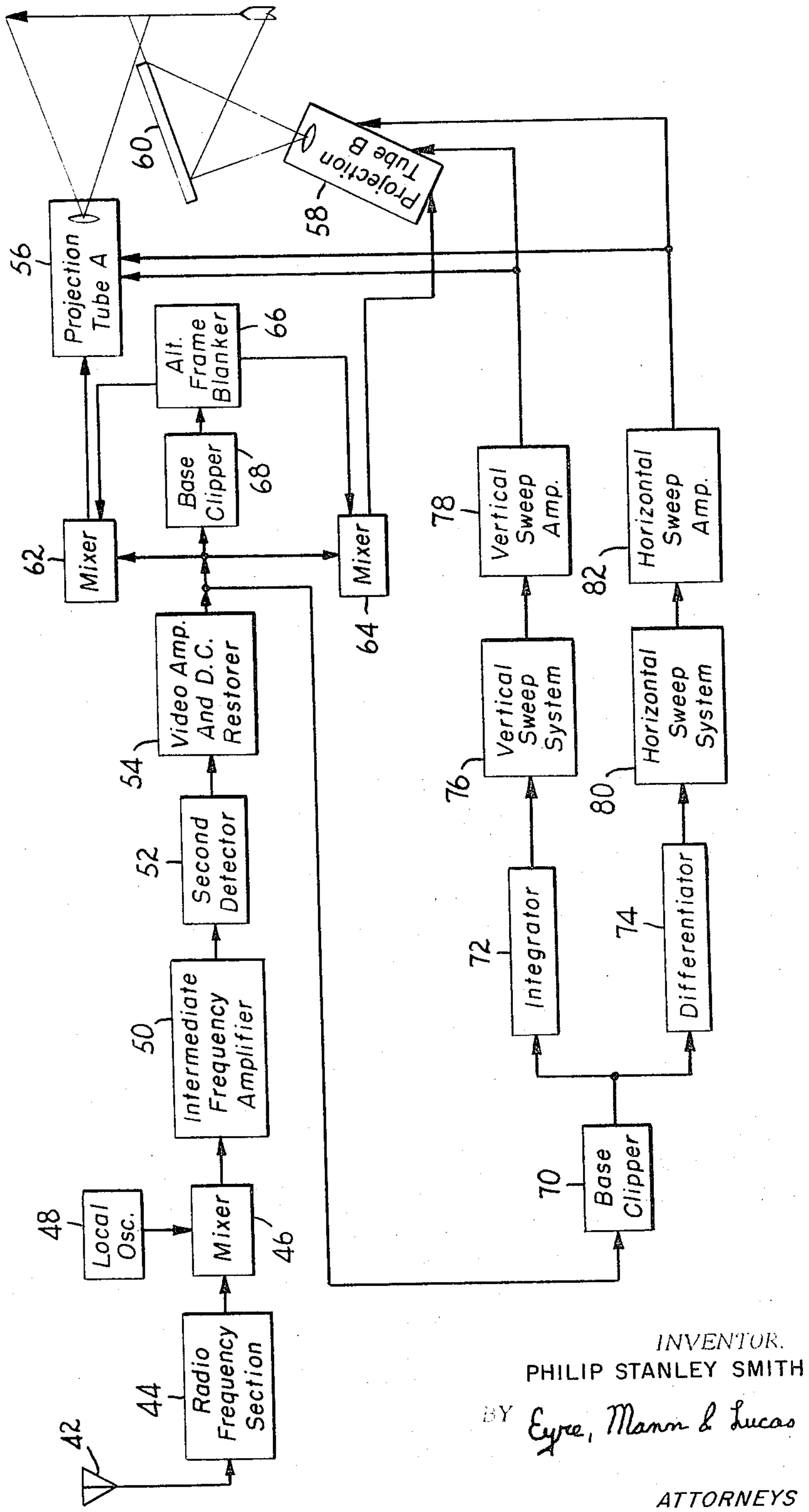
FIGURE 2 is a block diagram of a television receiving system for a theatre employing the present invention.

At each of the theatres which are equipped to pick up the information transmitted by the above described transmitter, a television receiver, such as shown in FIGURE 2, is provided. The signal transmitted from the antenna 38 of the transmitter of FIGURE 1 is picked up by the antenna 42 of each such receiver and fed into the radio frequency section 44 of the receiver which is tuned to the modulated radio frequency.

The output of the radio frequency of section 44 is fed into a mixer 46 where it is superimposed upon the output of the local oscillator 48 to produce the intermediate frequency signal. The intermediate frequency signal is fed through the intermediate frequency amplifier 50 into the second detector 52 to reproduce the video signal. The video signal is amplified and the level of the D.C. restored in the video amplifier and D.C. restorer 54 so that the blanking pulses will always cut off the electron beam of the cathode ray projection tubes no matter what the white content of the picture being projected.

Up until now the described receiver has not differed in any way from the usual commercial television receiver. However, the present receiver does differ drastically from the usual receiver for projection television in that it employs two cathode ray projection tubes 56 and 58 instead of the usual one. Like the camera tubes, the projection tubes are arranged around a mirror 60 so that images projected from one of the cameras 58 is projected directly on the screen while the images from the other camera 58 is reflected onto the screen by the mirror. Also the projection tubes are arranged so that images they project will overlap to exactly reproduce the conditions that existed in the camera tubes.

Therefore, what is necessary to reproduce the whole scene on the screen in overlapping sections is that the picture information from camera tube 10 in the television transmission system of FIGURE 1 be fed only into projection tube 56 and the picture information from camera tube 12 in the television transmission system of FIGURE 1 be fed only into projection tube 58. This is accomplished by blanking tube 56 when the video signal out of the video amplifier and D.C. restorer 54 is from camera tube 12 and blanking the projection tube 58 when the picture information out of the video amplifier and D.C. restorer is from camera 10.

To blank the projection tubes 56 and 58, the output of the video amplifier and D.C. restorer 54 is fed in parallel through separate mixers 62 and 64 to the control grid of the projection tubes 56 and 58 and at the correct time blanking pulses from a square wave generator are fed into the mixers 62 and 64 with the video picture information so that the blanking pulse and the video signal are summed and fed to the grids of the respective tubes to drive the grid sufficiently negative to cut off the election beam.

The square wave generator producing the blanking pulses is in a circuit represented in FIGURE 2 as the alternate frame blanker 66. The video picture information if fed into a base clipper 68 which allows only signals larger than the blanking pulse to pass through it. The output of the base clipper 68 is fed into the alternate frame blanker 66 which integrates the vertical pulse group of the vertical synchronizing pulses of the first field of each frame of video picture information and uses the pulse produced thereby to synchronize the square wave generator producing the blanking pulses so that the alternate frame blanking pulse begins and ends during the vertical blanking pulses of the first field of each frame of video picture information.

The sweep circuits for the receiver are similar to those in the usual commercial television system. The output of the video amplifier and D.C. restorer 54 is fed into a base clipper 70 which allows only signals to pass which are larger than the blanking pulses of the video information. The output of the base clipper 70 is fed into an integrator 72 and differentiator 74 in parallel. The integrator 72 integrates the vertical pulse group and produces a pulse which is fed to the vertical sweep system 76 to synch the saw tooth generator. The output of the vertical sweep system 76 is fed into the sweep amplifier 78 and from there in parallel to the vertical deflection coils of both the projection tubes 56 and 58. The output of the differentiator 74 is fed into the horizontal sweep system 80 where they are employed to correct a free-running saw tooth generator through an automatic frequency control system which corrects the frequency of the saw tooth pulses by comparing the saw tooth wave out of the saw tooth generator with the horizontal synchronizing pulses and bringing the saw tooth waves in line with the synchronizing pulses. The output of the horizontal sweep system 80 is fed into the horizontal sweep amplifier 82 and thereafter fed in parallel to the horizontal deflection coils of the projection tubes 56 and 58.

With this arrangement the projection tubes sweep in synchronism and project scenes on the screen in alternating overlapping sections.

To be sure that the overlapping sections of the images are in registration both the image orthicon camera tubes 10 and 12 and the cathode ray projection tubes 56 and 58 must be properly aligned.

Figure 3:
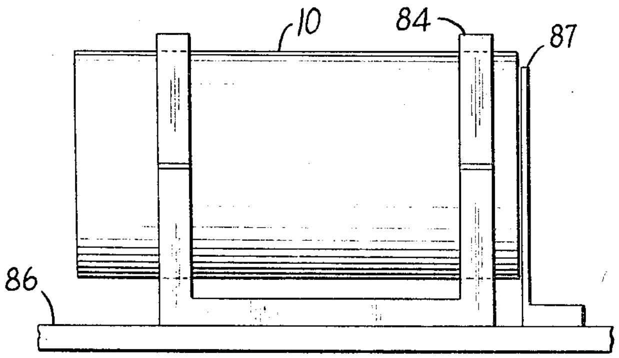
FIGURE 3 is a side view of one of the image orthicon tubes employed in the television transmission system of FIGURE 1 which shows how the image orthicon tubes are mounted.
Figure 4:
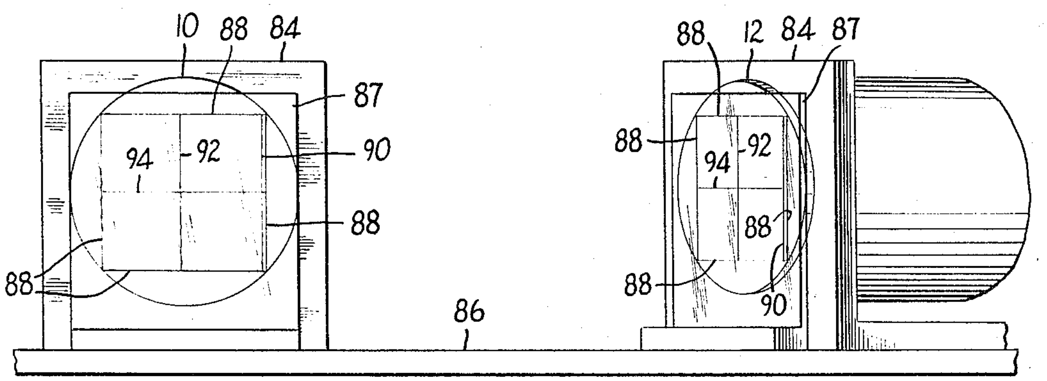
FIGURE 4 is a front view of both the image orthicon tubes employed in the television transmission system of FIGURE 1 which shows how the image orthicon tubes are mounted.

As is shown in FIGURES 3 and 4, both the image orthicon tubes 10 and 12 are positioned in a separate clamping yoke 84 on a common flat stationary platform 86. To align the tubes 10, and 12, a removable lined glass reticle 87 is positioned against the face of each of the tubes behind the lens for the tube. Each recticle 87 has lines 88 defining the boundries of the section of the scene picked up by its respective image orthicon tube, a vertical line 90 defining the center of the overlap areas of the sections, and a vertical line 92 and a horizontal line 94 which are centrally located in the sections. Without the lenses for the image orthicon tubes in place, the reticles are adjusted until the vertical lines of the two reticles are parallel and the horizontal lines both reticles are parallel and in line with each other. Then with the reticles in place and adjusted, the lenses 96 are positioned in front of reticles and the light is directed into the lenses 96 while the tubes are scanning. The images produced are viewed, and if either image orthicon tube is no properly aligned with its respective reticle, the clamping yoke is either raised or lowered and the tube is rotated clockwise or counterclockwise in the yoke until the lines 88 are along the periphery of the section being scanned by the image orthicon tube and the lines 92 and 94 are respectively vertical and horizontal in the section and cross over at the optical center of the section.

Figure 5:
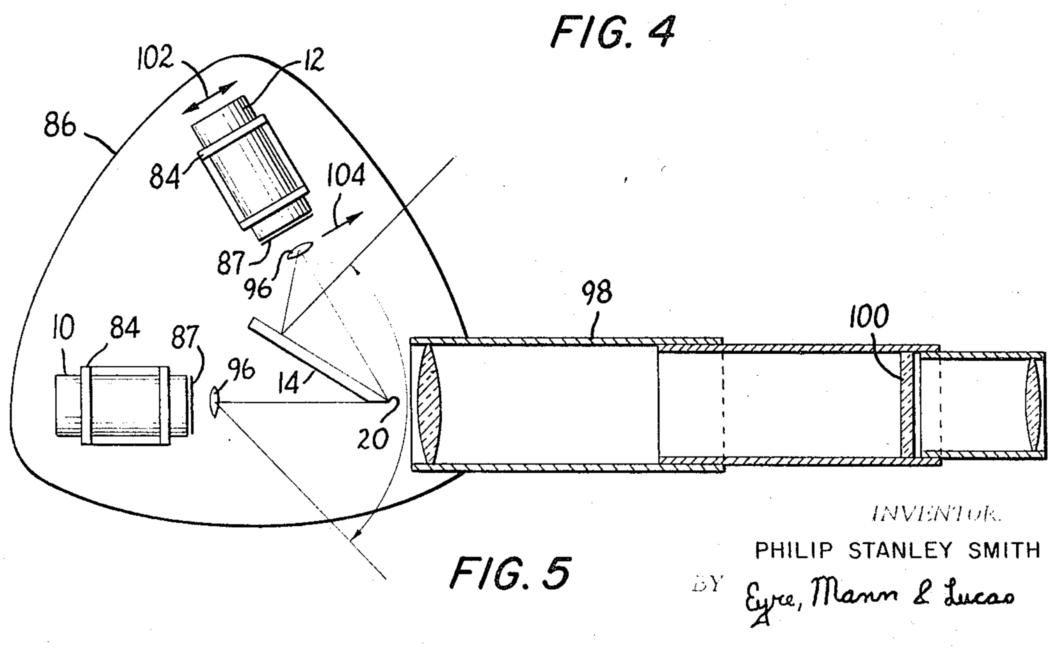
FIGURE 5 shows how the image orthicon tubes of FIGURES 2 and 3 are adjusted to assure alignment of the images on the projection screen.

This being done the lenses are focused at infinity and a special telescope 98 also focused at infinity is positioned on the platform and directed at the lenses as is shown in FIGURE 5. Located on the image plane of the telescope is a recticle 100 with cross hairs. The vertical cross hair is aligned with the bevelled edge of the mirror mirror 14 and the horizontal line of the cross hairs is aligned with the line 94 on each of the reticles 87. Looking through the telescope and observing you will see the vertical lines 90, one directly and one from its reflection off the mirror 14. If the vertical lines 90 of the camera tubes are not then superimposed, the image orthicon tube and its reticle are moved together along line 102 until they are.

If the lenses 96 are the so called constant image size lenses, that is those lenses that do not change image size with changes in the focus point of the lenses, such as a DETRAR lens, then adjustment of image orthicon tubes is completed. However, if the lenses are conventional lenses, the adjustment of the lines with the telescope must be repeated for other focus points. This is done by focusing the both lenses 87 and the telescope 98 at the desired focus point and then moving the lens for the image orthicon tube 12 and not the tube itself, laterally along line 104 until the vertical reticle line of the telescope 98 and the vertical lines 90 of each of the reticles 87 are superimposed. Usually this is done for four focus points, 3 ft., 15 ft., 25 ft. and 50 ft. and the position of the lens for each of those focus points is marked, and when desired, the lens can then be accurately positioned very quickly for focusing the lens at anyone of the focus points.

With the image orthicons now properly adjusted, the projection tubes 56 and 58 in the theatre can be adjusted. This is done by televising with the reticles 87 with the image orthicon tubes 10 and 12 and projecting the resultant images on the screen with the projection tubes 56 and 58. Then the projection tubes 56 and 58 may be moved until lines 90 are superimposed on the screen and the horizontal lines 88 are parallel and aligned with one another on the screen. The television system is then ready for operation. Of course before the system may be employed to televise scenes and project them on the screen, the reticles 87 must be removed from in front of the camera tubes 10 and 12.

Above is described one embodiment of the present invention. A number of changes could be made in this embodiment without departing from the spirit and scope of the present invention. For instance the mirror 60 used in the projection of the images need not be employed and instead both sections of the scene could be projected directly on the screen. Of course, if this were done, it would be necessary to electronically reverse the video signal supplied to camera 58 to compensate for the image reversal caused by the mirror 14 employed in televising the scene. Obviously other changes in the system can be made by those skilled in the art without departing from the spirit and scope of the invention. Therefore, it will be understood that this is intended to cover all changes and modifications of the embodiment herein chosen for the purpose of illustration which do not depart from the spirit and scope of the invention.

What is claimed is:

1. A system for projecting a televised scene in sections on a screen comprising means for providing successive groups of electric video signals of the complete scene, means for dividing each said group into successive sub-groups of electric video signals each of which sub-groups corresponds to a separate section of the entire scene, said dividing means including a mirror with a bevelled edge, a first camera tube which is positioned to televise one section of the scene directly past said bevelled edge and a second camera tube positioned to televise another section of the scene from its reflection in the mirror, said second camera tube being positioned so that the mirror image point of the entrance pupil of its lens is located substantially at the entrance pupil for the lens of the first camera tube, and projection means for separately projecting each section of the scene from said subgroups of electric video signals and assembling the scene sections into the entire scene.

2. The systems of claim 1 wherein said means for providing successive groups of electric video signals of the complete scene includes summing means for summing the outputs of both the first and second camera tubes and means for alternately blanking said first and second tubes so that while the output of said first camera tube is being fed into said summing means the output of said second camera tube is blanked and while the output of said second camera tube is being fed into said summing means the output of said first camera tube is blanked.

3. The system of claim 1 wherein said camera tubes are positioned so that they televise overlapping sections and said mirror has a bevelled knife edge which decreases the intensity of the light reaching the both camera tubes gradually towards the edge of their respective section in the overlapped section of the scene.

References Cited by the Examiner

UNITED STATES PATENTS

| | | | |
|---|---|---|---|
| 2,219,149 | 10/1940 | Goldsmith | 178—6.8 |
| 2,300,568 | 11/1942 | Hansell | 178—6 |
| 2,527,967 | 10/1950 | Schrader | 178—6 |
| 2,747,012 | 5/1956 | Dresser | 178—5.4 |
| 2,948,891 | 8/1960 | Smith | 178—7.85 |

DAVID G. REDINBAUGH, *Primary Examiner.*

R. L. RICHARDSON, *Assistant Examiner.*